Oct. 31, 1950     B. W. FREEMAN     2,528,302
DECORATING MACHINE
Filed Nov. 7, 1946
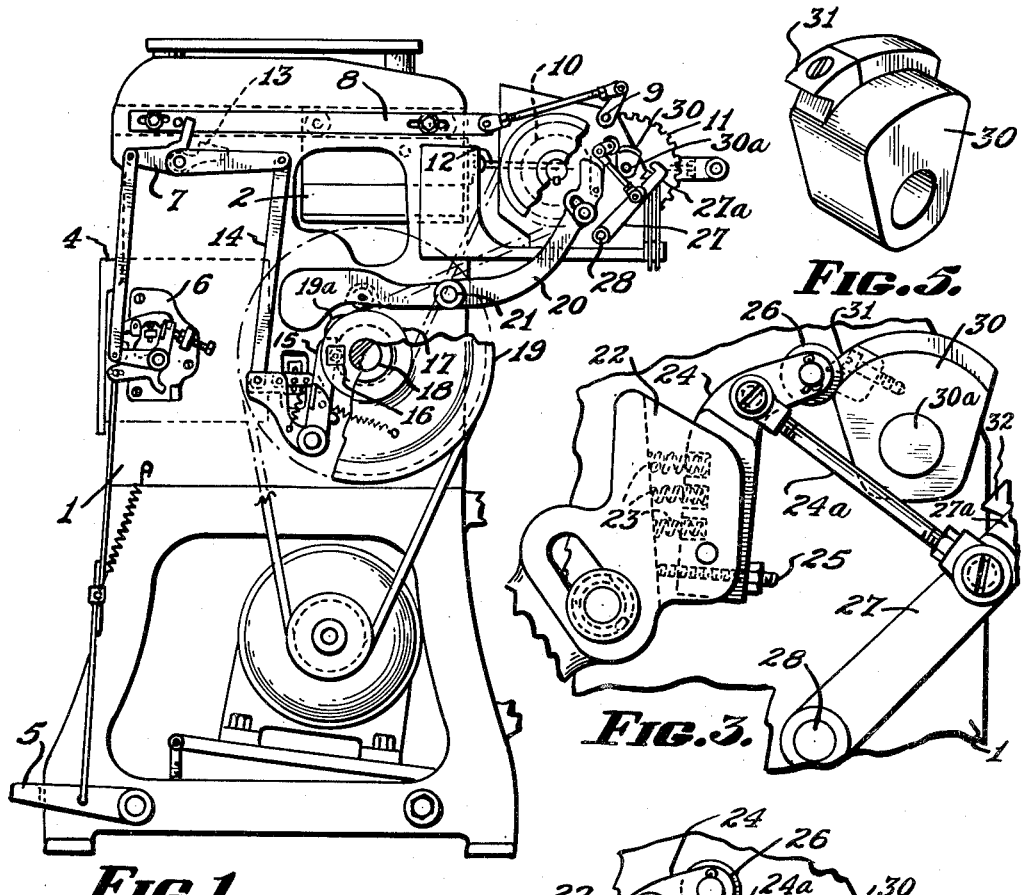
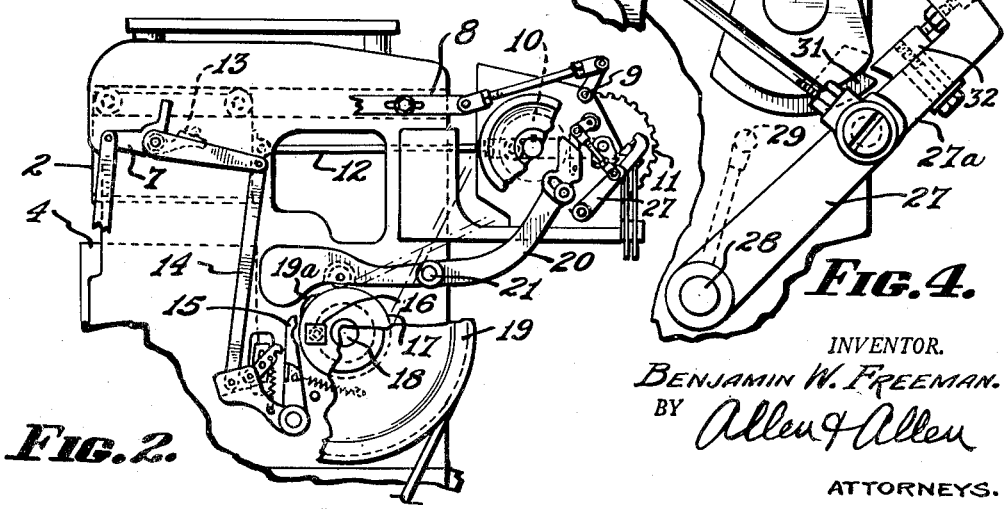
INVENTOR.
BENJAMIN W. FREEMAN.
BY Allen & Allen
ATTORNEYS.

Patented Oct. 31, 1950

2,528,302

UNITED STATES PATENT OFFICE 2,528,302

DECORATING MACHINE

Benjamin W. Freeman, Cincinnati, Ohio

Application November 7, 1946, Serial No. 708,400

11 Claims. (Cl. 101—316)

My invention relates to decorating machines more particularly for use in decorating shoe upper parts, and is a development of the machine shown and described in my U. S. Letters Patent No. 2,241,398. In that machine there is a sliding die carriage which cooperates with a plunger element, such that upon a treadling of the machine, the die carriage will move forward to a position for operation upon the work and then stop, whereupon it will initiate the plunger operation and the plunger with the work gauged thereon will reciprocate and cause the die on the die carriage to operate upon the work. Upon completion of the plunger movement, the die carriage operating device will automatically be energized and will move back to starting position and stop, whereupon the operator replaces a piece of work on the plunger ready for another operation.

In such a machine the die carriage movement controls the point at which the plunger begins its operation and the die carriage comes to a stop. If the die carriage happens to move beyond its full forward position, before stopping, i. e., starts to return, it will none the less start the plunger and the plunger operation will not make an accurate decoration of the piece of material thereon, because the die will be misplaced. Furthermore, this misplaced operation may take place repeatedly without the operator becoming cognizant of it, resulting in improper decoration of a number of pieces of work before the defective operation is noted.

It is the object of my invention to avoid this difficulty and to provide a structure which will result in the carriage being definitely stopped before an overthrow which would bring the die to a position sufficiently off true center position to result in defective work, and in addition will bring the machine to a stop requiring an act of the operator to get it going again. Thus the operator will know positively that the machine is not operating correctly and will call the foreman and not continue working with the machine until it is readjusted, and will not spoil any piece of work.

In the machine of my patent, the die carriage is caused to move by a friction clutch device which is electromagnetically controlled, and the carriage movement is imparted by a crank disk which makes one half revolution to move the carriage to forward position and makes the remaining half revolution to return it. The magnetic clutch embodies a brake and is intended to stop abruptly when a cam device disconnects current from the magnet. The stopping of the carriage movement is, however, subject to chance over throw if the brake does not work. In the illustration of my invention I have shown the same as applied to the mechanism of my patent, but it will be understood that mechanically controlled clutches could be substituted for electrical insofar as the principle of my invention is concerned.

In the drawings:

Figure 1 is a side elevation of a machine such as is shown in my letters patent above identified, in which the parts necessary to illustrate my invention are included. This view shows the parts in the idle position of the machine.

Figure 2 is a fragmentary side elevation of the machine showing the parts in position when the die carriage has moved through the first half of its cycle.

Figure 3 is an enlarged view of the interlocking mechanism and allied parts in the position of Figure 1.

Figure 4 is a like view to Figure 3 showing the parts in the position of Figure 2.

Figure 5 is a perspective of the interlocking cam structure.

Reference is made to my aforesaid patent for a more complete description of a machine to which I have illustrated the application of my present invention. The drawings herewith show a machine with a frame 1, a sliding die carriage 2, and a plunger 4. A foot treadle 5 is connected through a tripping device 6 to momentarily depress an arm 7. This arm acts to pull over a slide bar 8 which rocks a shaft 9 that applies initial current to the die carriage operating magnetic clutch 10.

This clutch drives a gear 11 which acts as a crank disk having a connecting rod 12, which engages the carriage. One half revolution of the disk will thrust the carriage to its forward position over the plunger. Thereupon the switch to the magnetic clutch will open by a cam (not shown) and the carriage stops at dead center of the crank disk. A second half revolution will pull the carriage back again to starting position.

Just as the carriage comes to its forward position it depresses a finger 13 which operates a linkage 14 to move a finger 15. The finger 15 acts normally to hold a spring biased driving key 16 in idle position on the clutch hub 17 which is located on the plunger operating shaft 18. A driven pulley and fly wheel 19 is free on the shaft 18 and carries a laterally recessed hub which is engaged by the driving key when it is released. The arrangement is such that when the carriage reaches its full forward position the driving key is released momentarily by tripping of the finger 15, whereupon the fly wheel drives the shaft 18 through the medium of the key. The finger rests on the pulley hub in position to engage the key upon completion of the revolution of the fly wheel. Thus when set into operation the plunger moves up and back down again and comes to a stop. The shaft may operate the plunger by a crank operated toggle.

As the drive shaft and clutch hub thereon come to a position near the completion of the single rotation of said shaft, a cam nose 19a sets into motion the carriage driving clutch to bring about a return of the carriage. The mechanism as illustrated for accomplishing this consists in a rocking arm 20 pivoted at 21, and terminating in a lost motion head. This, in the form shown, consists of a bifurcated member 22, held adjustably on the end of the arm and having a set of springs 23 therein. Pivoted in this member 22 is a finger 24 having a movement away from the member limited by an adjustable screw 25, but which can rock into the said member against the pressure of the springs. The finger carries a contact roller 26, and has pivoted thereto a link 24a which is also pivoted to an arm 27. The arm 27 is located fast on a shaft 28 which operates electrical contacts for bringing about a return of the carriage, as by a contacting closing arm 29.

The rocking arm 20 engages the clutch hub so as to lie in the path of the cam nose 19a. When the nose engages the arm 20 it is rocked so as to push the arm 27 and establish an electrical contact that will return the carriage. In this way the complete cycle of the machine is brought about, the die carriage moving forward and stopping, the plunger then being caused to rise and fall and the carriage then being caused to return to stopped position.

As already stated, the object of my invention is to hold the carriage at its forward position within close limits and if it tends to go beyond these limits to bring the cycle of the machine to a stop requiring special intervention of the operator to get it going again.

The machine of my patent aforesaid provides a cam 30 located on the same shaft 30a as the crank disk that operates the carriage. This cam as shown in my patent aforesaid, acts on a mechanism corresponding to the roller 26 on the end of the finger 24 of the structure illustrated herein, being so located that it strikes up the finger and tilts the rocking arm to position of engagement with the clutch hub of the machine (Fig. 3). That is to say, when the cam nose operates the rocking arm to bring about a return operation of the carriage, the arm remains in its rocked position until returned by the action of this cam 30, and incident to its return pulls the arm 27 to cut current from the magnetic clutch. It should be noted, however, that if the arm 27 on the shaft 28 which throws in the energizing current to the carriage driving clutch is held against movement under the influence of the rocking arm finger 24, and link 24a, then it will not operate to apply current to energize the clutch and all that will happen is that the finger 24 will be forced over against its biasing springs.

At one edge of this cam 30 where it rides close to the edge of the arm 27, I provide a latching dog 31, the operating end of which is undercut, as shown. I also place on the arm 27, a matching dog 32, with an undercut face lying in the path of the dog 31. As shown this may be done by securing a second arm 27a to the arm 27 and letting it project beyond the arm 27. If we now refer to Figure 4, which shows the parts when the carriage is in its full forward position, it will be noted that the two dogs are spaced from each other enough so that if the rocking arms is operated the arm 27 can be swung by the link 24a and will apply the current to the carriage operating clutch for its return motion. If the dog 31 is in a very slightly advanced position from that shown in Figure 4, it will engage the dog 32. This will stop the shaft 30a from revolution, and thus stop the crank disk from movement and lock the carriage in a definite position.

This slight movement when related to the crank disk operation of the carriage will result in stopping the carriage against overthrow at a position within around .003 inch of its full forward position. This is because a considerable motion of the crank disk which is at dead center at this point will apply very little return motion to the connecting rod. Thus the two dogs will serve to hold the carriage against movement beyond a point where the operation of the die will ruin the piece of work on the plunger. It should be observed, however, that a variation in gauging of even this amount is not at all desirable, and hence the mechanism makes provision against its repetition.

If the two dogs engage each other, then as the clutch hub on the shaft that operates the plunger brings the cam nose against the rocking arm that applies current for return of the carriage, the arm 27 that brings about this current application cannot move because of the undercut relation of the two dogs. What this means is that while the plunger will come to its stopped position at the end of its stroke, the die carriage will remain forward. The operator then knows that the machine is out of adjustment, and must make arrangements to start it up again.

The placing of the interlocking dogs need not be on the rocking arm return cam, as will be apparent.

Having thus described my invention by an example thereof, what I claim to be novel and desire to secure by Letters Patent is:

1. In combination in a decorating machine, a carriage movable to and from an operating position, power means for driving said carriage, means for clutching and unclutching the carriage from said power means, manual means for engaging the clutch for a half revolution, machine operated means for engaging the clutch for a second half revolution, these two half revolutions moving the carriage through its cycle, said machine operated means including a rocking arm, a rotating device moving with the power means, and an interlock on the rotating device and rocking arm, arranged to engage each other if the carriage moves beyond the initial half revolution point of said clutch.

2. The combination of claim 1 in which the interlocks are undercut so that upon engagement the rocking arm will not move nor the carriage move.

3. The combination of claim 1 in which the interlocks are undercut so that upon engagement the rocking arm will not move nor the carriage move, said machine operated means having an operating element connected to the machine by a lost motion device.

4. In a decorating machine of the type described, a magnetic clutch, a die carriage, a crank for said carriage operated through said magnetic clutch, a plunger, means whereby the carriage is moved to position opposite the plunger for a work decorating operation, and then moved back to starting position, manually operated switch means for applying current to the magnetic clutch for a half revolution thereof connected to move the crank through one half revolution, means for applying current to the magnetic clutch for half revolution thereof, connected to move the crank through a second half revolution, said last mentioned means including a rocking arm, a rotating element moving with the crank, said rotating element provided with an undercut abutment, an undercut matching abutment located on the rocking arm, said abutments arranged to be slightly spaced from each other when the carriage is moved by the crank to its operating position, thus permitting the rocking arm to be moved, but arranged to interengage with each other should the carriage move past dead center of the crank before a work decorating operation, thus stopping the carriage and preventing said rocking arm from being moved.

5. In a machine for the purposes described, a carriage movable from a position of rest to an operative position and return, crank means for driving said carriage, manual means for initiating movement of said carriage to the operative position, a plunger for movement into and out of contact with said carriage when said carriage is in the operative position, power means for moving said plunger through its complete movement initiated by the movement of the die carriage into operative position, means activated by the plunger power means to bring about a return of the carriage to rest position, in combination with a member moving with the crank means, and interlocking means on said member means and said activated means so placed as to engage each other if the carriage moves beyond the operative position during its initial movement.

6. In a machine for the purposes described, a carriage movable from a position of rest forward to an operative position and return, crank means for driving the carriage, control means for initiating movement of the carriage to the operative position, a plunger for movement into and out of contact with the carriage when the carriage is in operative position, power means for moving said plunger through its complete movement initiated by the movement of the carriage into operative position, means actuated by the plunger power means to bring about a return of the carriage to its rest position, said last mentioned means including a rocking arm, in combination with a member moving with the carriage, and interlocking means on said member and the rocking arm, said interlocking means being positioned to interlock only if said carriage moves beyond the operative position on its initial forward movement.

7. The combination of claim 6 in which the said interlocks are undercut.

8. In a machine for the purposes described, a carriage movable from a position of rest to an operative position and return, a crank for driving said carriage, means for initiating movement of said carriage to the operative position, a plunger for movement into and out of contact with said carriage when said carriage is in operative position, power means for moving said plunger through its complete movement initiated by the movement of the die carriage into operative position, means actuated by the plunger power means to bring about a return of the carriage to its rest position, said last mentioned means including a movable arm, in combination with a cam shafted to said crank and moving therewith, and interlocking means on said cam and said rocker arm, said interlocking means positioned to engage one another should the carriage move from the operative position before movement of the plunger through its cycle.

9. In a machine for the purpose described, a carriage movable from a position of rest to an operative position and return, a crank having a shaft for driving said carriage, means for initiating movement of said carriage to the operative position, a plunger for movement into and out of contact with said carriage when the carriage is in operative position, power means for moving said plunger from a position of rest, into a position of contact with said carriage and back to a position of rest, power control means for said plunger power means actuated by said carriage when in operative position, and means actuated by said plunger power means to initiate movement of said carriage from said operative position to said position of rest, in combination with a member on said shaft, movable detent-carrying means interlocking with said member upon movement of said crank slightly beyond operative position of said carriage to prevent further movement of said carriage, and a connection between said detent-carrying means and said means for initiating return movement of said carriage to move said detent-carrying means out of the way of said member.

10. The structure of claim 9 in which said crank is at dead center position when said carriage is in operative position, and in which said member and detent-carrying means engage slightly beyond said dead center position, whereby said carriage is locked in a position so nearly operative position as to produce successful coaction of said plunger and carriage.

11. The structure claimed in claim 9 in which said plunger power means bears a cam, in which said means for initiating return movement of said carriage comprises a lever operated in one direction by said cam, in which said movable detent-carrying means is a rocker arm having a linkage connection with said lever, in which said member is a cam for moving said lever in the opposite direction, and in which said lever includes a lost motion device whereby movement of said lever will not produce motion of said rocker arm if said member and arm are interlocked.

BENJAMIN W. FREEMAN.

REFERENCES CITED

The following references are of record in the file of this patent:

UNITED STATES PATENTS

| Number | Name | Date |
| --- | --- | --- |
| 1,990,598 | Freeman | Feb. 12, 1935 |
| 2,138,793 | Muller | Nov. 29, 1938 |
| 2,241,398 | Freeman | May 13, 1941 |
| 2,268,585 | Freeman | Jan. 6, 1942 |
| 2,277,363 | Herbers | Mar. 24, 1942 |